(12) United States Patent
Limbacher

(10) Patent No.: US 11,279,375 B2
(45) Date of Patent: Mar. 22, 2022

(54) METHOD FOR OPERATING A MOTOR VEHICLE HAVING A PLURALITY OF DRIVER ASSISTANCE SYSTEMS

(71) Applicant: AUDI AG, Ingolstadt (DE)

(72) Inventor: Reimund Limbacher, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 232 days.

(21) Appl. No.: 16/337,758

(22) PCT Filed: Oct. 17, 2017

(86) PCT No.: PCT/EP2017/076432
§ 371 (c)(1),
(2) Date: Mar. 28, 2019

(87) PCT Pub. No.: WO2018/073217
PCT Pub. Date: Apr. 26, 2018

(65) Prior Publication Data
US 2020/0001893 A1 Jan. 2, 2020

(30) Foreign Application Priority Data
Oct. 18, 2016 (DE) ...................... 10 2016 220 313.4

(51) Int. Cl.
*B60W 50/14* (2020.01)
*B60W 30/18* (2012.01)
(52) U.S. Cl.
CPC ............ *B60W 50/14* (2013.01); *B60W 30/18* (2013.01); *B60W 2556/00* (2020.02)
(58) Field of Classification Search
CPC ... B60W 50/14; B60W 30/18; B60W 2556/00
See application file for complete search history.

(56) References Cited

U.S. PATENT DOCUMENTS 9,248,742 B2 2/2016 Wimmer et al.
9,685,083 B2 6/2017 Hahne et al.
(Continued)

FOREIGN PATENT DOCUMENTS

CN 101925484 A 12/2010
CN 103827938 A 5/2014
(Continued)

OTHER PUBLICATIONS

International Search Report and Written Opinion of the International Searching Authority directed to related International Patent Application No. PCT/EP2017/076432, dated Feb. 12, 2018, with attached English-language translation; 26 pages.
(Continued)

*Primary Examiner* — Peter D Nolan
*Assistant Examiner* — Demetra R Smith-Stewart
(74) *Attorney, Agent, or Firm* — Sterne, Kessler, Goldstein & Fox P.L.L.C.

(57) ABSTRACT

A method is disclosed for operating a motor vehicle having a plurality of driver assistance systems, wherein the method includes setting, via an operator interface of the motor vehicle, an assistance degree parameter, which indicates the extent to which support for a driver by the driver assistance systems is desired. The method also includes setting, via the operator interface of the motor vehicle, at least one additional parameter, which is related to the driving operation of the motor vehicle. The method additionally includes specifying, by a processing device of the motor vehicle, at least one operating parameter for each driver assistance system, in accordance with which operating parameter the driver assistance system is operated, as a function of the assistance degree parameter and the additional parameter(s). A motor vehicle is also disclosed that performs the method.

16 Claims, 2 Drawing Sheets

(56) References Cited

U.S. PATENT DOCUMENTS

| | | | |
|---|---|---|---|
| 10,144,446 B2 * | 12/2018 | Anma | B62D 5/0463 |
| 2013/0173147 A1 * | 7/2013 | Takeuchi | G06F 17/00 |
| | | | 701/123 |
| 2014/0236386 A1 | 8/2014 | Yoshizawa et al. | |
| 2016/0001781 A1 * | 1/2016 | Fung | B60K 28/02 |
| | | | 701/36 |
| 2016/0167565 A1 * | 6/2016 | Foltin | B60Q 1/085 |
| | | | 315/82 |
| 2016/0221575 A1 * | 8/2016 | Posch | B60W 30/14 |
| 2016/0307444 A1 * | 10/2016 | Koshizen | G08G 1/0145 |
| 2017/0025430 A1 * | 1/2017 | Lee | H01L 27/11573 |
| 2017/0129500 A1 | 5/2017 | Hipp | |
| 2017/0329330 A1 * | 11/2017 | Hatano | G05D 1/021 |
| 2018/0364657 A1 * | 12/2018 | Luo | G05B 13/024 |
| 2020/0172123 A1 * | 6/2020 | Kubota | B60W 60/0053 |

FOREIGN PATENT DOCUMENTS

| | | |
|---|---|---|
| CN | 104176061 A | 12/2014 |
| DE | 102007029594 A1 | 1/2009 |
| DE | 102010003985 A1 | 8/2011 |
| DE | 102010046918 A1 | 3/2012 |
| DE | 102010047778 A1 | 4/2012 |
| DE | 102012002305 A1 | 8/2013 |
| DE | 202013006466 U1 | 12/2014 |
| DE | 102013011550 A1 | 1/2015 |
| DE | 102014214559 A1 | 1/2016 |
| DE | 102014215258 A1 | 2/2016 |
| DE | 102015225932 A1 | 6/2017 |
| EP | 1355209 A1 | 10/2003 |
| WO | WO 2009/096882 A1 | 8/2009 |
| WO | WO-2014076758 A1 * | 5/2014 ... B60W 30/095 |

OTHER PUBLICATIONS

International Preliminary Report on Patentability directed to related International Patent Application No. PCT/EP2017/076432, dated Apr. 23, 2019, with attached English language translation; 14 pages.

* cited by examiner

METHOD FOR OPERATING A MOTOR VEHICLE HAVING A PLURALITY OF DRIVER ASSISTANCE SYSTEMS

TECHNICAL FIELD

This disclosure relates to a method for operating a motor vehicle having a plurality of driver assistance systems. In addition, this disclosure relates to a motor vehicle.

BACKGROUND

Modern motor vehicles often have a multitude of driver assistance systems, which can support the driver during vehicle operation and/or which can take over vehicle guidance from the driver temporarily or long-term. In an extreme case, the motor vehicle can be fully automated, which means that it can be driven automatically and without any supervision by the driver. During highly or partly automated driving, a driver assistance system likewise assumes the lateral and/or longitudinal guidance, wherein this must be constantly supervised by the driver. However, driver assistance systems are also utilized during manual driving and/or during assisted driving, in which the driver continues to carry out the lateral and/or longitudinal guidance of the motor vehicle.

Especially during a manual driving operation, a multitude of different driver assistance systems can be used. This makes it possible to support the driver on many levels, such as with navigation and by automatic distance control systems. Nevertheless, the increasing number of provided driver assistance systems can be confusing for the user. Furthermore, the configuration of a multitude of driver assistance systems is relatively time-consuming. Although it is known, for instance, that driver profiles can be provided in motor vehicles, by means of which a driver can easily re-use settings once they have been set, a particular configuration of all driver assistance systems is ultimately established for a particular driver in this way.

A method for operating a driver assistance system is known from document DE 10 2010 003 985 A1, in which the current driving situation can be determined on the basis of at least one sensor. In this way, a driving dynamics limit range is identified, which is used as a basis for a route recommendation that can be displayed to the driver. The driving dynamics limit range and/or the route recommendation can be adapted in consideration of the current state and/or ability of the driver and/or at least one optimization criterion. Additionally, operating parameters of other vehicle systems, especially other driver assistance systems, as well, can be appropriately adapted in accordance with said optimization criterion. However, the described selection of the optimization criterion is usually not flexible enough to carry out the complete configuration of the driver assistance systems. It thus remains necessary to set parameters of the driver assistance systems individually for each of the driver assistance systems.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
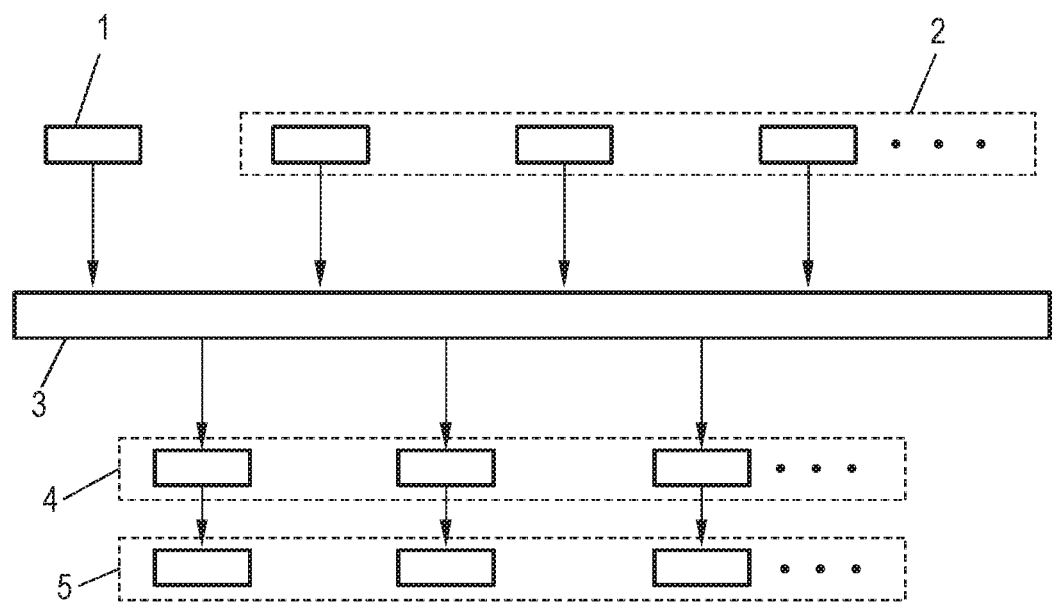
FIG. 1 illustrates a flow chart of an exemplary embodiment of the method disclosed herein.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This disclosure addresses the problem of indicating an integrated assistance function that can provide the driver with the functionality of a multitude of driver assistance systems while at the same time being quickly and easily adaptable to the requirements of the user.

The problem is solved by a method for operating a motor vehicle that has multiple driver assistance systems, comprising the following steps:

setting an assistance degree parameter, which indicates the extent to which support for the driver by the driver assistance systems is desired, by means of an operator interface of the motor vehicle;

setting at least one additional parameter, which is related to the driving operation of the motor vehicle, by means of the operator interface; and specifying at least one operating parameter for each driver assistance system, in accordance with which operating parameter the driver assistance system is operated, as a function of the assistance degree parameter and the additional parameter by means of a processing device of the motor vehicle.

It is proposed that multiple driver assistance systems be configured collectively by setting an assistance degree parameter, which indicates the degree of support for the driver by the driver assistance systems in their entirety, while also setting an additional parameter or multiple additional parameters relating to the driving operation of the motor vehicle. Abstract parameters that do not relate to a concrete driver assistance system but rather to vehicle operation in general can be used as additional parameters. For example, using an additional parameter, it is possible to choose whether a more dynamic or more fuel-efficient driving operation is desired, or it is possible to at least draw upon an additional parameter describing a general type of journey, i.e., whether it is a time-critical journey or whether enjoyment of driving is primary.

From these set items of information, which can ultimately indicate a desired degree of support and a general type of driving operation, the processing system can automatically determine the manner in which any driver assistance should take place and configure the individual driver assistance systems accordingly by specifying appropriate operating parameters. In this way, a complex network of assistance functions can be provided with minimal configuration effort. The individual driver assistance systems thus interact as a comprehensive assistance function that can inform, warn, and correct the driver, in particular during a manual driving mode, as needed and depending upon the driver's wishes and/or can intervene in the driving operation if required. This driving function can ultimately support the driver in the manner of a passenger, driving instructor, or co-pilot. The method disclosed herein thus represents a kind of configurable coach for the driving operation, especially when the driver assistance systems are configured to be entirely or primarily informational.

In the method, it is not necessary for all driver assistance systems to be active for all settings of the assistance degree parameter and/or the additional parameter. Depending upon the assistance degree parameter and the additional parameter, individual driver assistance systems can be deactivated completely or in particular driving situations. Nevertheless, it should be possible to adjust the assistance degree parameter in such a way that at least one driver assistance system is active in each of at least two settings, at least in particular driving situations.

The operator interface can be implemented as a graphical menu, by means of which both the assistance degree parameter and the additional parameter or parameters can be set. The assistance degree parameter and/or additional parameters can be adjusted quasi-continuously, e.g., by illustrated sliders, or in multiple discrete steps, such as by virtual selector buttons. It is also possible that a selection is made between two parameter values using a type of switch. This menu can be operated using a touch screen or other actuation element, such as a rotary and slider control, which interact with a display device.

With the additional parameter, it is possible to select between an operating mode of the motor vehicle in which fuel consumption by the motor vehicle is minimized and an operating mode of the motor vehicle in which a probable duration until a destination is reached is minimized. Put another way, the additional parameter can choose between time efficiency and fuel efficiency. This choice can also take place in multiple steps, and so intermediate steps can be chosen between time efficiency and fuel efficiency. For example, if high fuel efficiency is supposed to be achieved, then a speed limitation device can be activated, driving instructions can be given in order to minimize fuel consumption, an especially fuel-efficient route can be determined by the navigation system, etc. Additionally, other vehicle systems, such as engine control, can also be parameterized as a function of this kind of additional parameter.

Additionally or alternatively, it is possible that at least one boundary condition is specified by the additional parameter and is evaluated in the course of determining a driving route of the motor vehicle to a destination by a navigation system. The navigation system in this instance can be one of the driver assistance systems that are parameterized as a function of the assistance degree parameter and the at least one additional parameter. It is also possible, however, that the navigation system is parameterized independently of the assistance degree parameter and/or other additional parameters.

The boundary condition can specify that the quickest possible route should be selected and/or that a route that is interesting to drive to see and/or a route with at least one relevant location, especially a place of interest, a hotel, a restaurant or a shopping option, and/or with at least one charging station or charging opportunity or filling station should be selected. As was previously explained, a parameterization of the driver assistance systems can occur as a function of the type of journey in the method. Depending upon the boundary conditions selected, a conclusion can be drawn as to the type of journey. If, for instance, the motor vehicle is supposed to travel on a route that leads the motor vehicle to a charging station, then the driver assistance systems can be configured such that an energy-efficient driving mode occurs in order to reduce further discharging of the energy storage device and thus reduce a time delay during charging. If the motor vehicle is to be driven on a scenic route, for instance, then the driver assistance systems can be configured in such a way that a driver is guided to a relatively quiet drive, wherein it is possible to verify even more closely whether the driver is paying sufficient attention to the operation of the vehicle.

In the method, a plurality of additional parameters can advantageously be used. For example, a first additional parameter can select between the time efficiency and the fuel efficiency of the driving operation, and one or more further additional parameters can specify boundary conditions for route planning. The further additional parameters can have, in particular, exactly two options, namely whether or not a corresponding boundary condition should be active.

In the method, it is possible that the driver assistance system evaluates the provided input data (including the assistance degree parameter and the additional parameter(s)) only when it is operated in an active operating mode in order to activate at least one vehicle system in accordance with the input data, wherein the operating parameter specifies whether or in what driving situation the respective driver assistance system is operated in the active operating mode. The vehicle device can be an actuator, for example, which is activated to carry out a driving procedure, or an information device for providing information to the driver of the motor vehicle. For example, information devices can be display devices, devices for emitting acoustic information, or actuators for producing haptic information.

Even in the active operating mode, the vehicle device does not have to be activated continuously, but instead an activation can occur only when a control condition that evaluates the input data has been satisfied. For example, an automatic distance control system, if it is active, can activate an engine control of the motor vehicle to reduce the driving power and/or activate a brake of the motor vehicle to decelerate the motor vehicle when the input data indicate that a distance to the vehicle traveling ahead has fallen below a threshold value. However, if the automatic distance control system is in an inactive operating mode due to the operating parameter, then it does not activate any vehicle systems even when the input data would result in a corresponding activation in an active operating mode. In general terms, in the method, at least one driver assistance system cannot activate a vehicle device when it is being operated in an inactive mode due to the associated operating parameter or parameters.

As was previously mentioned, it is possible that a driver assistance system is operated in an active operating mode as a function of the operating parameter only in particular driving situations. In this case, the activation of the driver assistance system can depend, for example, upon a type of the street on which the vehicle is traveling, a charging state of an energy storage device, a traffic density, the presence of speed restrictors, a detected fatigue of the driver, a current velocity or, if it is permitted, a presence of a speed control. For example, a speed restrictor can be activated for particular values of the operating parameter only when a speed limit is specified on the street on which the vehicle is traveling and, insofar as a corresponding check is permitted, when it is known that speed controls are being carried out in a section of road ahead. A lane departure warning system can be activated at particular values of the operating parameter, for example, only when an activation condition has been satisfied that evaluates information from a fatigue and/or attention detection by the motor vehicle.

Additionally or alternatively, it is possible that the driver assistance system, in at least one operating mode of the driver assistance system, evaluates the input information that has been provided in order to carry out an activation of at least one vehicle device in accordance with said data, wherein the operating parameter parameterizes the dependence of the activation upon the input data. For example, it is possible to specify threshold values for the input data or a portion of the input data, which determine when an activation of the vehicle device occurs. However, it is also possible for functions that identify an activation signal from the input data or from portions of the input data to be parameterized by the operating parameter in order, for example, to adapt a curve progression of the correlation between the input data and an activation signal.

In the method, it is possible that the driver assistance systems are purely informative driver assistance systems or implement a purely assistive or partially automated driving operation. As was indicated above, the method can be used in an especially advantageous way in cases in which the driver is driving the motor vehicle manually and/or in which the driver is performing at least portions of the motor vehicle guidance manually. The method can be used in this case to support and coach the driver as required.

Of course, it is possible that a motor vehicle in which the method is employed can have highly automated or fully automated guidance. For example, a common menu can be provided, in which it is possible to select from between a coached driving operation and a highly or fully automated driving operation and which also permits the coached driving operation to be configured according to the disclosed method embodiments. In this instance, it is possible to use the method for the entire configuration of the driver assistance system, and so a highly automated or fully automated driving operation can be selected by setting a corresponding assistance degree parameter. Alternatively, however, it is also possible to use the method exclusively for operating modes of the motor vehicle, in which at least partly manual guidance of the motor vehicle is occurring.

A menu that is used to set the assistance degree parameter and the at least one additional parameter can additionally include further setting options for the driving operation of the motor vehicle. For example, a route type can be switched between a street route, a route in the countryside and an automatic recognition of the street type. A corresponding setting can be taken into account as an additional parameter in the method, but it can also serve only to configure individual vehicle components, such as a transmission, an engine control, and/or a chassis.

A navigation system and/or a location-based information service and/or a fatigue detection-based driver assistance system and/or a lane departure warning system and/or a lane-change assistance system and/or an avoidance maneuver assistance system and/or an assistance system for information about intersections and/or junctions and/or a road sign display assistance system and/or a speed recommendation assistance system and/or a speed restriction assistance system and/or a warning assistance system for warning of local dangers and/or an efficiency assistance system can be used as a driver assistance system.

The driver assistance systems can support the driver with various driver tasks or can completely or partially take over these tasks from the driver. Driver tasks can be divided into three levels, namely a navigation level, a route guidance level and a stabilization level. The navigation level relates to driver tasks that relate to the selection of the route and the determination of the chronological sequence of the route.

For example, driver tasks on the navigation level include the choice of a destination and the departure time, the planning of a route, the planning of breaks, the recognition of and reaction to traffic congestion and detours, a planning or refueling and/or charging stops, and the like. The route guidance level relates to the choice of route variables, i.e., in particular a target lane and a target velocity. The associated tasks are lane selection, determining whether a lane change should be carried out, recognizing the ideal line, planning evasive maneuvers, choosing a speed in consideration of the speed limits and possibly any existing speed controls, optimizing fuel consumption, detecting and/or optimizing the time required to reach a destination, recognizing and reacting to weather conditions, and the like. In the stabilization level, the specific regulating variables, i.e., steering, acceleration, and braking inputs, are specified in order to guide the motor vehicle along the route planned in the route-guidance level.

The method can be used especially advantageously to configure and/or parameterize driver assistance systems that support the driver in driver tasks of navigation and/or the route-guidance level or that completely or partly take over these tasks from the driver. These are the same tasks in which a good passenger or a driving instructor, i.e., a coach, would also support a driver. Therefore, an alternative to an automated driving operation can ultimately be provided by the method, namely an operating mode in which the driver retains complete control over the motor vehicle but is supported and advised by the jointly configured driver assistance systems in accordance with his or her wishes and expectations.

In the method, an automatic gear shift can also be configured as a driver assistance system. In addition, boost and/or recuperation strategies for an electrical driving operation can be specified by driver assistance systems that have been parameterized in the manner disclosed herein. A speed recommendation assistant can specify speeds, especially as a function of an identified or received traffic signal status. Location-based information services are mobile services that selectively provide the user with information with the aid of position-dependent data. Depending upon the configuration, i.e., depending upon the operating parameter, these can be used to display information to the driver via a display, for example, or to emit the information acoustically. For example, information about filling station prices, points of interest, hotels or the like can be provided. The type of output and/or the information provided can depend upon the assistance degree parameter and/or the additional parameter.

Depending upon the operating mode, efficiency assistants can advise the driver to step on or let up on the accelerator in order to optimize efficiency in accordance with boundary conditions, which can depend upon the additional parameter and/or the operating parameter. Additionally, advice can be given as to when overtaking another vehicle could be practical, when an acceleration or braking should take place, and what route, preferably what ideal line, should be followed.

Apart from the method embodiments, further embodiments relate to a motor vehicle having a plurality of driver assistance systems, a processing device, and an operator interface, wherein the processing device is configured to identify the assistance degree parameter of the additional parameter via the operator interface and to parameterize the driver assistance systems by the disclosed method. With the features explained with regard to the disclosed method, the motor vehicle can be developed with the same or similar advantages as discussed for the disclosed method.

Figure 2:
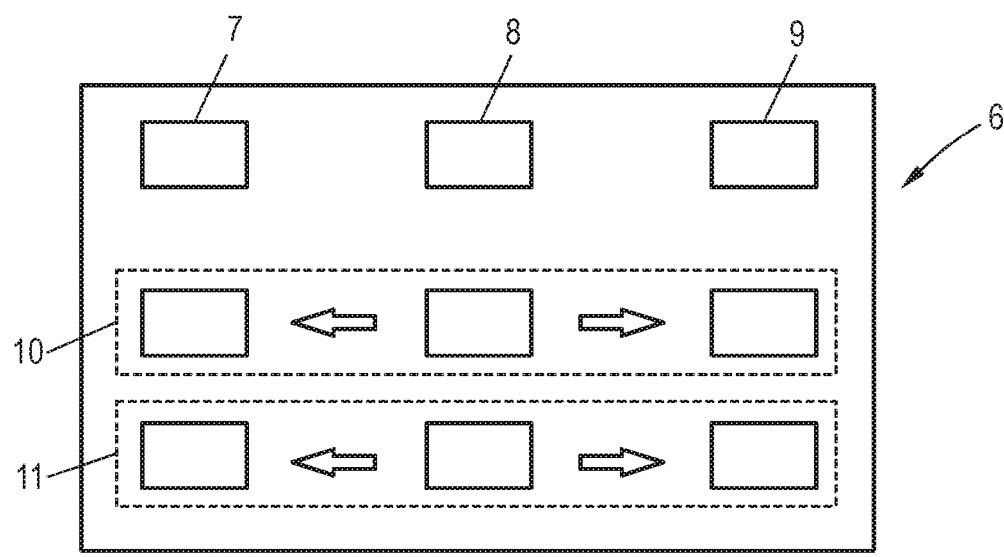
FIG. 2 illustrates a representation of a menu system that can be used as an operator interface in the method according to the exemplary embodiment of FIG. 1.
Figure 3:
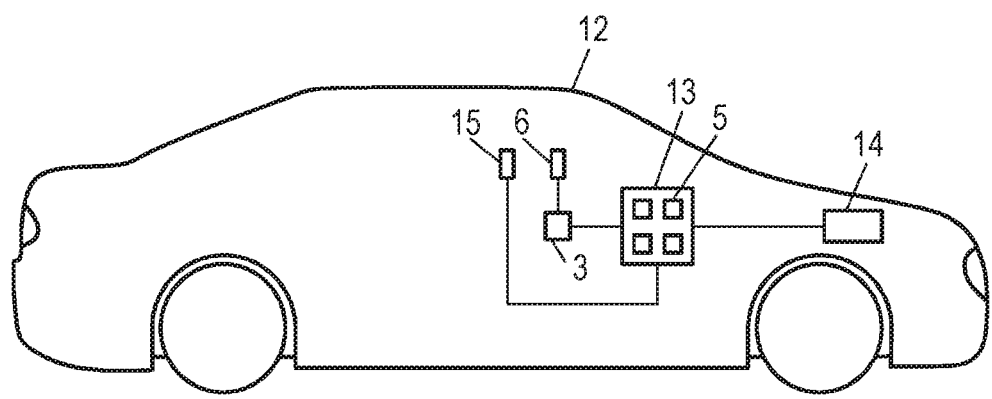
FIG. 3 illustrates an exemplary embodiment of a motor vehicle performing the disclosed method.

Further advantages and details of this disclosure are found in the following exemplary embodiments and the associated drawings. The following is shown schematically:

FIG. 1 illustrates a flow chart of an exemplary embodiment of the method disclosed herein;

FIG. 2 illustrates a representation of a menu system that can be used as an operator interface in the method according to the exemplary embodiment of FIG. 1; and FIG. 3 illustrates an exemplary embodiment of a motor vehicle performing the disclosed method.

FIG. 1 schematically shows the progress of a method for operating a motor vehicle having a plurality of driver assistance systems. In the method, an assistance degree parameter 1 and multiple additional parameters 2 are first set by a driver of the motor vehicle. Here, the assistance degree parameter 1 indicates the extent to which the driver desires support from the driver assistance systems. The driver can further parameterize the desired driving operation by means of the additional parameter 2, wherein a particular type of journey can be specified via abstract settings.

One of the additional parameters 2 can select quasi-continuously or with two or more steps between an operating mode of the motor vehicle in which fuel consumption by the motor vehicle is minimized and an operating mode of the motor vehicle in which a probable duration until a destination is reached is minimized. The driver can thus determine quickly and efficiently whether the driver assistance systems should be configured in such a way that they help him or her to increase time efficiency or fuel efficiency. One or more further additional parameters 2 can specify boundary conditions, which are evaluated in the course of determining a driving route of the motor vehicle to a destination by a navigation system. For example, these can be boundary conditions that specify that a charging or refueling of the motor vehicle should be carried out along the route, that the route should include particular points of interest, e.g., it should be scenic and/or should pass by hotels or shopping opportunities, that particular streets should be used or avoided, and/or that a destination should be reached especially quickly or especially economically. From these selected boundary conditions, it is possible to draw a conclusion about the journey type later in the course of the procedure, for example, whether reaching the destination quickly, the fuel efficiency or driving enjoyment for the driver are of primary importance in the current driving operation. Accordingly, the driver assistance systems can subsequently be configured automatically.

The setting of the assistance degree parameter 1 and the additional parameter 2 is carried out by means of an operator interface 6, which is represented exemplarily in FIG. 2 in the form of a touch screen. Multiple boxes 7-11 are represented on this touch screen, which, when touched, can bring about a setting of the assistance degree parameter 1 and/or the additional parameter 2 can cause a switch to sub-menus, in which a further setting is possible. Boxes 7, 8 and 9 can serve to activate and deactivate particular boundary conditions for determining the driving route. Touching the corresponding box can result in a heretofore deactivated boundary condition being activated, and vice versa. Touching one of boxes 7, 8, 9 can thus modify the respective value of one of the additional parameters. For example, the boundary condition that an especially fast route should be selected can be activated and deactivated by touching box 7, that particular points of interest should be located on the route by touching box 8 and that a charging opportunity should be located on the route by touching box 9. In a development of this user guidance, it would be possible that touching box 8 prompts a sub-menu to be opened, in which the points of interest that should be located on the route can be selected.

A further additional parameter relating to the time and/or fuel efficiency of the driving operation can be set by the boxes 10. If the left-side box 10 is selected, for example, especially high time efficiency can be set, and if the right-side box 10 is selected, especially high fuel efficiency can be set. The center box 10 can select normal operation, in which both efficiencies are optimized with a particular weighting. In a development, it is also possible that touching the center box opens a sub-menu that allows for further settings.

The three boxes 11 in the lowest row serve to set the assistance degree parameter 1. When the left-side box 11 is selected, a maximum degree of assistance can be selected, in which a driver is supported by detailed information and optionally by driving procedures. If the right-side box 11 is selected, a minimum of information is provided to the driver. The center box 11 selects a medium degree of assistance, which can optionally be further set by means of a sub-menu that is opened by touching the center box 11.

The assistance degree parameter 1 and the additional parameter 2 are processed by a processing device 3 of the motor vehicle, whereby at least one operating parameter 4 is provided for each of a multiple driver assistance systems 5. For the sake of clarity, only one operating parameter 4 is shown in FIG. 1 for each of the driver assistance systems 5. However, it is also possible to specify multiple operating parameters for some or all of the multiple driver assistance systems 5. The specification of the operating parameters can be carried out, for example, by storing a look-up table in the processing device 3, which indicates parameter values for the various operating parameters for each combination of assistance degree parameters and additional parameters. Since a very large number of driver assistance systems have become known and numerous configuration options now exist, a corresponding configuration should be described below only on the basis of individual examples.

If a driver selects boxes 8 and 9 on the operator interface shown in FIG. 2, for example, in order to indicate that the motor vehicle should take a route with particular points of interest, such as restaurants and attractions, and with charging opportunities, and if the driver also selects maximum fuel efficiency with the right-side box 10 and a maximum degree of assistance with the left-side box 11, then this indicates that the driver wishes to have a relaxed drive with high energy efficiency, wherein, based on the selected point-of-interest route, this will probably be a drive for enjoyment purposes, such as a vacation journey. Operating parameters 4 for individual driver assistance systems 5 are specified on the basis of these settings, and so these systems are configured as follows: The navigation system is configured such that a route with attractions or a scene route is selected, wherein navigation is initially planned to a charging station that is as close as possible to the planned destination along the route. Moreover, a predictive efficiency assistant is activated, which the navigation system provides with information about the upcoming route and which advises the driver on the basis of this information as to when he or she should step on or let up on the accelerator in order to maximize efficiency. Additionally, further vehicle systems, such as an engine control, can be parameterized in order to increase efficiency further. The efficiency assistant also cooperates with a speed recommendation assistant that, in particular, depending upon information about the changing of traffic lights along the route, issues speed recommendations to the driver.

In addition, a plurality of driver assistance systems 5 are activated, which inform the driver about the vehicle surroundings and/or the current driving situation. Identified road signs relevant to the current route are displayed to the driver by a road sign display device. Furthermore, a warning assistant, which obtains information from a radio traffic service or via car2car or car2x communication, for example, is activated to warn about local dangers, such as slick roads, accidents, or fog on the route. Also activated are driver assistance systems 5 that can draw attention to other road users that may be relevant to the vehicle operation in complex driving situations. An activated intersection assistant can warn the driver about pedestrians or vehicles crossing intersections, for example, and a lane-change assistance system can give the driver information as to the extent to which traffic in another lane could influence the lane change. A location-based information service is activated to provide the driver with information about attractions along the route. An avoidance maneuver assistant is additionally activated, which gives the driver driving instructions when there is a risk of collision to support the driver in avoiding it, or it intervenes in the driving operation itself.

As a result of the parameterization, multiple driver assistance systems 5 are also configured in such a way that they intervene in the driving operation only in particular driving situations. For example, a predictive speed limitation device, which limits the maximum velocity of the motor vehicle, is configured such that it is active only when the route traveled has a speed limit. In this instance, the speed is limited in such a way that it differs from the prescribed maximum speed by an offset, which is determined as a function of one of the specified operating parameters. An active lane guidance system, which engages in the driving operation in order to guide the motor vehicle to the center of a lane, is also activated in particular driving situations. The activation occurs only when it is detected by a fatigue detection device in the motor vehicle that the driver is tired or when it is determined by evaluating the preceding driving operation that a monotonous journey, such as driving in a straight line on a highway with no or few lane changes, has taken place for a given amount of time.

Additionally, a fatigue detection-based driver assistance system is activated as a driver assistance system 5 that recommends that the driver take a break as a function of recognized fatigue. This driver assistance system 5 is configured such that recognized points of interest on the route and charging opportunities are considered for the break recommendations.

In another exemplary embodiment, the driver would like to reach his or her destination as quickly as possible and would like to forgo assistance functions he or she considers unnecessary. To this end, for example, the driver activates box 7 and deactivates boxes 8 and 9 on the operator interface 6, whereby the route planning occurs in such a way that a route that is as fast as possible is determined. Furthermore, the driver selects the left-side box 10 in order to configure the vehicle guidance as a whole, including the driver assistance systems 5, in such a way that a time-efficient guidance of the motor vehicle can occur, and selects the right-side box 11 to choose a low degree of assistance. In this case, as is explained below, the driver assistance systems are configured such that relatively few driver assistance systems 5 are activated and such that maximum time efficiency is achieved.

A fastest route is determined by the navigation system. The predictive efficiency assistant is configured such that the driver is not given any indication as to when efficiency could be increased by letting up on the accelerator. To maximize time efficiency, the driver is given guidance on practical overtaking maneuvers, an ideal line for expeditious driving and optimal points for accelerating and braking.

Of the further assistance systems that have been discussed above, only the road sign display device and the warning assistant for warning about local dangers are continuously active. The predictive speed limitation assistant is configured such that it is active only when there is a speed limit. If an evaluation of information allows it to be determined whether speed measurements are being carried out on the route ahead, the speed restriction assistant can also be configured such that speed restrictions are performed only in the case of speed measurements on the route ahead. In addition, it is possible to select an offset relative to the predetermined maximum velocity that is different from the one in the example given above.

The further driver assistance systems 5 are deactivated by the specification of corresponding operating parameters 4 so that they no longer process input data and no control of the vehicle systems takes place.

FIG. 3 shows an exemplary embodiment of a motor vehicle 12, which is configured to carry out the method explained above. For this purpose, the motor vehicle 12 has an operator interface 6, by which the assistance degree parameter 1 and the additional parameter 2 can be set. As was previously explained, these parameters are processed by a processing device 3 of the motor vehicle in order to identify the operating parameters 4 for the driver assistance systems 5. In this connection, a control device 13 of the motor vehicle 12 implements the various driver assistance systems 5. The control device 13 and the processing device 3 can of course also be configured as a joint device. As explained, the driver assistance systems 5 in this instance can give the driver guidance and/or engage in the driving operation by activating the vehicle devices 14, 15. Vehicle device 14 is an actuator, for example, which permits an automatic braking of the motor vehicle 12, and vehicle device 15 is a display device, for example, for providing driving instructions to the driver. Vehicle devices 14, 15 are provided only as examples of further vehicle devices that can be controlled by the various driver assistance systems 5.

The invention claimed is:

1. A method for operating a motor vehicle having a plurality of driver assistance systems, the method comprising:
    setting, via an operator interface of the motor vehicle, an assistance degree parameter, wherein the assistance degree parameter indicates an extent to which support for a driver by at least one of the plurality of driver assistance systems is desired;
    setting, via the operator interface of the motor vehicle, at least one additional parameter, wherein the at least one additional parameter is related to a driving operation of the motor vehicle; and
    specifying, by a processing device of the motor vehicle, at least one operating parameter for each of the at least one of the plurality of driver assistance systems,
        wherein the at least one operating parameter corresponds to one of the at least one of the plurality of driver assistance systems, and
        wherein the one of the at least one of the plurality of driver assistance systems is operated as a function of the assistance degree parameter and the at least one additional parameter.

2. The method of claim 1, further comprising:
selecting, using the at least one additional parameter, between a first operating mode of the motor vehicle in which fuel consumption by the motor vehicle is minimized and a second operating mode of the motor vehicle in which a probable duration until a destination is reached is minimized.

3. The method of claim 1, further comprising:
specifying at least one boundary condition, by the at least one additional parameter; and
evaluating the at least one boundary condition, wherein the at least one boundary condition is evaluated in the course of determining, by a navigation system, a driving route of the motor vehicle to a destination.

4. The method of claim 1, further comprising:
evaluating, by the one of the at least one of the plurality of driver assistance systems, provided input data, including the assistance degree parameter and the at least one additional parameter, only when the one of the at least one of the plurality of driver assistance systems is operated in an active operating mode; and
activating, by the one of the at least one of the plurality of driver assistance systems, at least one vehicle system in accordance with the provided input data, wherein the at least one operating parameter specifies whether or in what driving situation the one of the at least one of the plurality of driver assistance systems is operated in the active operating mode.

5. The method of claim 1, further comprising:
evaluating, by the one of the at least one of the plurality of driver assistance systems, in at least one operating mode of the one of the at least one of the plurality of driver assistance systems, provided input data, including the assistance degree parameter and the at least one additional parameter; and
activating at least one vehicle device in accordance with the provided input data, wherein the at least one operating parameter parameterizes a dependence of the activating upon the provided input data.

6. The method of claim 1, wherein the plurality of driver assistance systems are purely informative driver assistance systems.

7. The method of claim 1, wherein the plurality of driver assistance systems implement a purely assistive or partially automated driving operation.

8. The method of claim 1, wherein the one of the at least one of the plurality of driver assistance systems is a navigation system, a location-based information service, a fatigue detection-based driver assistance system, a lane departure warning system, a lane-change assistance system, an avoidance maneuver assistance system, an assistance system for information about intersections or junctions, a road sign display assistance system, a speed recommendation assistance system, a speed restriction assistance system, a warning assistance system for warning of local dangers, or an efficiency assistance system.

9. A motor vehicle having a plurality of driver assistance systems, a processing device, and an operator interface, wherein the processing device is configured to:
identify an assistance degree parameter, wherein the assistance degree parameter is set via an operator interface of the motor vehicle, and wherein the assistance degree parameter indicates an extent to which support for a driver by at least one of the plurality of driver assistance systems is desired;
identify at least one additional parameter, wherein the at least one additional parameter is set via the operator interface, and wherein the at least one additional parameter is related to a driving operation of the motor vehicle; and
specify at least one operating parameter for each of the at least one of the plurality of driver assistance systems, wherein the at least one operating parameter corresponds to one of the at least one of the plurality of driver assistance systems, and
wherein the one of the at least one of the plurality of driver assistance systems is operated as a function of the assistance degree parameter and the at least one additional parameter.

10. The motor vehicle of claim 9, wherein the processing device is further configured to:
select, using the at least one additional parameter, between a first operating mode of the motor vehicle in which fuel consumption by the motor vehicle is minimized and a second operating mode of the motor vehicle in which a probable duration until a destination is reached is minimized.

11. The motor vehicle of claim 9, wherein the processing device is further configured to:
specify at least one boundary condition, by the at least one additional parameter; and
evaluate the at least one boundary condition, wherein the at least one boundary condition is evaluated in the course of determining, by a navigation system, a driving route of the motor vehicle to a destination.

12. The motor vehicle of claim 9, wherein at least one processor of the one of the at least one of the plurality of driver assistance systems is configured to:
evaluate provided input data from the processing device, wherein the provided input data includes the assistance degree parameter and the at least one additional parameter, only when the one of the at least one of the plurality of driver assistance systems is operated in an active operating mode; and
activate at least one vehicle system in accordance with the provided input data, wherein the at least one operating parameter specifies whether or in what driving situation the one of the at least one of the plurality of driver assistance systems is operated in the active operating mode.

13. The motor vehicle of claim 9, wherein at least one processor of the one of the at least one of the plurality of driver assistance systems is further configured to:
evaluate, in at least one operating mode of the one of the at least one of the plurality of driver assistance systems, provided input data, including the assistance degree parameter and the at least one additional parameter; and
activate at least one vehicle device in accordance with the provided input data, wherein the at least one operating parameter parameterizes a dependence of the activation upon the provided input data.

14. The motor vehicle of claim 9, wherein the plurality of driver assistance systems are purely informative driver assistance systems.

15. The motor vehicle of claim 9, wherein the plurality of driver assistance systems implement a purely assistive or partially automated driving operation.

16. The motor vehicle of claim 9, wherein the one of the at least one of the plurality of driver assistance systems is a navigation system, a location-based information service, a fatigue detection-based driver assistance system, a lane departure warning system, a lane-change assistance system, an avoidance maneuver assistance system, an assistance system for information about intersections or junctions, a road sign display assistance system, a speed recommendation assistance system, a speed restriction assistance system, a warning assistance system for warning of local dangers, or an efficiency assistance system.

* * * * *